United States Patent
Bridges et al.

(10) Patent No.: US 9,223,384 B2
(45) Date of Patent: Dec. 29, 2015

(54) SYNTHESIZING INTERMEDIATE PERFORMANCE LEVELS IN INTEGRATED CIRCUITS, AND RELATED PROCESSOR SYSTEMS, METHODS, AND COMPUTER-READABLE MEDIA

(71) Applicant: QUALCOMM Incorporated, San Diego, CA (US)

(72) Inventors: Jeffrey Todd Bridges, Raleigh, NC (US); Yeshwant Nagaraj Kolla, Wake Forest, NC (US); Sanjay B. Patel, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 13/733,054

(22) Filed: Jan. 2, 2013

(65) Prior Publication Data
US 2014/0040647 A1    Feb. 6, 2014

Related U.S. Application Data

(60) Provisional application No. 61/677,841, filed on Jul. 31, 2012.

(51) Int. Cl.
*G06F 1/32* (2006.01)

(52) U.S. Cl.
CPC ............. *G06F 1/324* (2013.01); *G06F 1/3234* (2013.01); *G06F 1/3296* (2013.01); *Y02B 60/1217* (2013.01); *Y02B 60/1285* (2013.01)

(58) Field of Classification Search
CPC ..... G06F 1/324; G06F 1/3234; G06F 1/3296; Y02B 60/1217; Y02B 60/1285
See application file for complete search history.

(56) References Cited

U.S. PATENT DOCUMENTS

| 7,526,745 | B2 | 4/2009 | Vergara-Escobar |
| 7,539,882 | B2 | 5/2009 | Jessup et al. |
| 7,694,266 | B1 | 4/2010 | Sankaralingam |
| 7,986,160 | B2 | 7/2011 | Hoang et al. |
| 8,072,237 | B1 | 12/2011 | Rahim et al. |

(Continued)

FOREIGN PATENT DOCUMENTS

EP       0066637 A1    12/1982

OTHER PUBLICATIONS

International Search Report and Written Opinion—PCT/US2013/053051—ISA/EPO—Feb. 24, 2014.

*Primary Examiner* — M Elamin
(74) *Attorney, Agent, or Firm* — Gerald P. Joyce, III

(57) ABSTRACT

Synthesizing intermediate performance levels in integrated circuits, and related processor systems, methods, and computer-readable media are disclosed. In one embodiment, a synthesized performance level setting circuit receives an input indicating a synthesized performance mode. The circuit generates a power source selection output to select a first power source providing power to an integrated circuit functional block at a first voltage level, and generate a clock frequency setting output to select a first clock frequency associated with the first voltage level to clock the functional block, for a first predefined time interval. The circuit also generates the power source selection output to select a second power source to provide power at a second voltage level lower than the first voltage level, and generate the clock frequency setting output to select a second clock frequency associated with the second voltage level to clock the functional block, for a second predefined time interval.

42 Claims, 8 Drawing Sheets

(56) References Cited

U.S. PATENT DOCUMENTS

| | | | |
|---|---|---|---|
| 8,589,709 B2 * | 11/2013 | Harchol-Balter et al. | 713/323 |
| 2006/0254296 A1 * | 11/2006 | Finkelstein et al. | 62/259.2 |
| 2008/0307240 A1 | 12/2008 | Dahan et al. | |
| 2010/0169609 A1 * | 7/2010 | Finkelstein et al. | 712/43 |
| 2011/0022868 A1 * | 1/2011 | Harchol-Balter et al. | 713/323 |
| 2012/0023345 A1 | 1/2012 | Naffziger et al. | |

* cited by examiner

SYNTHESIZING INTERMEDIATE PERFORMANCE LEVELS IN INTEGRATED CIRCUITS, AND RELATED PROCESSOR SYSTEMS, METHODS, AND COMPUTER-READABLE MEDIA

PRIORITY CLAIM

The present application claims priority to U.S. Provisional Patent Application Ser. No. 61/677,841 filed on Jul. 31, 2012, and entitled "Synthesizing Intermediate Performance Levels In Integrated Circuits, And Related Processor Systems, Methods, And Computer-Readable Media," which is incorporated herein by reference in its entirety.

BACKGROUND

I. Field of the Disclosure

The technology of the disclosure relates generally to processing of computer instructions in integrated circuit-based systems.

II. Background

A synchronous digital circuit, such as a central processing unit (CPU) of a computer system, is typically integrated onto a semiconductor die, and may comprise a number of functional blocks encompassing a wide variety of functional elements. Each functional block of the circuit may be operated at one of a variety of performance levels associated with a supply voltage and a corresponding clock frequency, where the clock frequency is a maximum frequency at which the circuit is able to operate properly at the supply voltage. It is well known in the art that a higher supply voltage for a functional block of an integrated circuit may result in a higher maximum clock frequency, and that each clocked operation carried out by the functional block consumes more energy per operation at a higher supply voltage than at a lower supply voltage. Accordingly, in order to maximize energy efficiency of operations to be performed, it is desirable to set a performance level of the functional block to a performance level high enough to satisfy requirements of the computational task, but no higher.

However, in a practical integrated circuit, it may not be possible to set the performance level of a functional block to an arbitrary, optimal performance level. For instance, an integrated circuit may be capable of natively generating only certain set voltages and/or frequencies, corresponding to discrete performance levels that are either lower or higher than the optimal performance level. As a result, the performance level at which the functional block must operate may be either insufficient to satisfy the performance requirements of the operations to be performed, or else may exceed the performance requirements of the operations, thus resulting in an unnecessary expenditure of energy and processing resources.

SUMMARY OF THE DISCLOSURE

Embodiments of the disclosure provide synthesizing intermediate performance levels in integrated circuits. Related processor systems, methods, and computer-readable media are also disclosed. In this regard, in one embodiment, a synthesized performance level setting circuit configured to synthesize an intermediate performance level for a functional block of an integrated circuit is provided. The synthesized performance level setting circuit is configured to receive as input a performance mode input. In response to receiving the performance mode input indicating a synthesized performance mode, the synthesized performance level setting circuit is configured to generate a power source selection output to select a first power source to provide power to the functional block for a first predefined time interval, and generate a clock frequency setting output to select a first clock frequency associated with the first voltage level to clock the functional block for the first predefined time interval. The synthesized performance level setting circuit is also configured to generate the power source selection output to select a second power source to provide power to the functional block at a second voltage level lower than the first voltage level for a second predefined time interval, and generate the clock frequency setting output to select a second clock frequency lower than the first clock frequency and associated with the second voltage level to clock the functional block for the second predefined time interval. In this manner, the functional block may effectively operate at a more efficient intermediate performance level that lies between two discrete performance levels natively provided by the integrated circuit.

In another embodiment, a synthesized performance level setting circuit configured to synthesize an intermediate performance level for a functional block of an integrated circuit is provided. The synthesized performance level setting circuit comprises a means for receiving as input a performance mode input, and a means for determining that the performance mode input indicates a synthesized performance mode. The synthesized performance level setting circuit also comprises a means for selecting, responsive to a determination that the performance mode input indicates the synthesized performance mode, a first power source to provide power to the functional block at a first voltage level for a first predefined time interval, and a first clock frequency associated with the first voltage level to clock the functional block for the first predefined time interval. The synthesized performance level setting circuit further comprises a means for selecting a second power source to provide power to the functional block at a second voltage level lower than the first voltage level for a second predefined time interval, and selecting a second clock frequency lower than the first clock frequency and associated with the second voltage level to clock the functional block for the second predefined time interval, responsive to a determination that the performance mode input indicates the synthesized performance mode.

In a further embodiment, a method for synthesizing an intermediate performance level for a functional block of an integrated circuit is provided. The method comprises receiving as input a performance mode input. The method also comprises, responsive to receiving the performance mode input indicating a synthesized performance mode, selecting a first power source to provide power to the functional block at a first voltage level for a first predefined time interval, and selecting a first clock frequency associated with the first voltage level to clock the functional block for the first predefined time interval. The method further comprises, responsive to receiving the performance mode input indicating the synthesized performance mode, selecting a second power source to provide power to the functional block at a second voltage level lower than the first voltage level for a second predefined time interval, and selecting a second clock frequency lower than the first clock frequency and associated with the second voltage level to clock the functional block for the second predefined time interval.

In an additional embodiment, a non-transitory computer-readable medium is provided, having stored thereon computer-executable instructions to cause a processor to implement a method for synthesizing an intermediate performance level for a functional block of an integrated circuit. The method implemented by the computer-executable instructions includes receiving as input a performance mode input. The method implemented by the computer-executable instructions further includes, responsive to receiving the performance mode input indicating a synthesized performance mode, selecting a first power source to provide power to the functional block at a first voltage level for a first predefined time interval, and selecting a first clock frequency associated with the first voltage level to clock the functional block for the first predefined time interval. The method implemented by the computer-executable instructions also includes, responsive to receiving the performance mode input indicating the synthesized performance mode, selecting a second power source to provide power to the functional block at a second voltage level lower than the first voltage level for a second predefined time interval, and selecting a second clock frequency lower than the first clock frequency and associated with the second voltage level to clock the functional block for the second predefined time interval.

DETAILED DESCRIPTION

Figure 1:
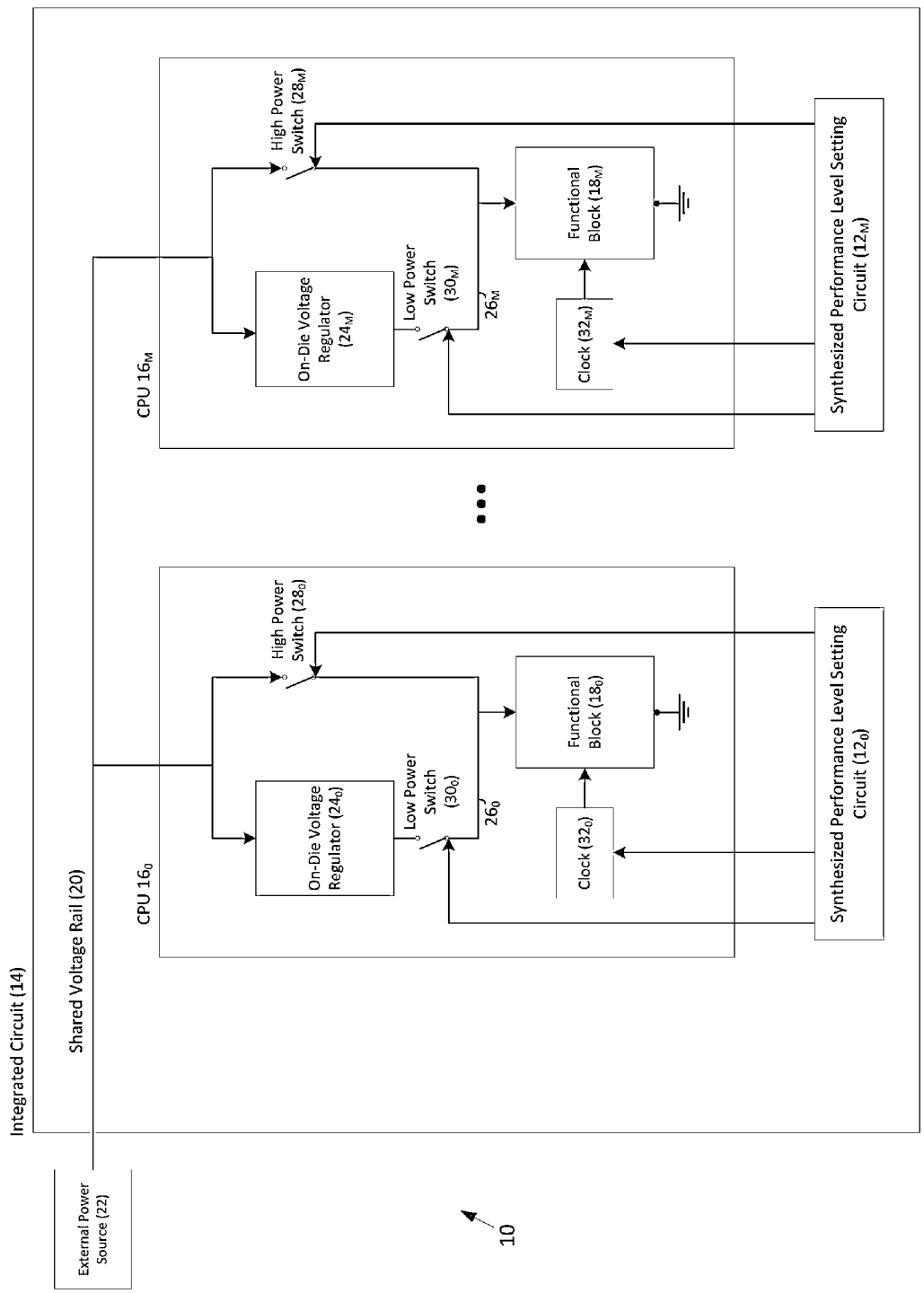
FIG. 1 is a schematic illustration of exemplary components provided in a processor-based system for selecting a power source and associated clock frequency, including a synthesized performance level setting circuit configured to synthesize an intermediate performance level for a functional block of an integrated circuit.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide synthesizing intermediate performance levels in integrated circuits. Related processor systems, methods, and computer-readable media are also disclosed. In this regard, in one embodiment, a synthesized performance level setting circuit configured to synthesize an intermediate performance level for a functional block of an integrated circuit is provided. The synthesized performance level setting circuit is configured to receive as input a performance mode input. In response to receiving the performance mode input indicating a synthesized performance mode, the synthesized performance level setting circuit is configured to generate a power source selection output to select a first power source to provide power to the functional block for a first predefined time interval, and generate a clock frequency setting output to select a first clock frequency associated with the first voltage level to clock the functional block for the first predefined time interval. The synthesized performance level setting circuit is also configured to generate the power source selection output to select a second power source to provide power to the functional block at a second voltage level lower than the first voltage level for a second predefined time interval, and generate the clock frequency setting output to select a second clock frequency lower than the first clock frequency and associated with the second voltage level to clock the functional block for the second predefined time interval. In this manner, the functional block may effectively operate at a more efficient intermediate performance level that lies between two discrete performance levels natively provided by the integrated circuit.

In this regard, FIG. 1 is a schematic illustration of exemplary components provided in a processor-based system 10 for selecting a power source and associated clock frequency. As will be discussed in more detail herein, the processor-based system 10 provides synthesized performance level setting circuits 12(0-M), each of which are configured to synthesize an intermediate performance level for a corresponding functional block(s) of an integrated circuit. The processor-based system 10 includes an integrated circuit 14, which comprises one or more central processing units (CPUs) 16(0-M). The CPU(s) 16(0-M) includes functional blocks 18(0-M), each of which may encompass any one of or a combination of known digital logic elements, semiconductor circuits, processing cores, and/or memory structures, among other elements. Embodiments described herein are not restricted to any particular arrangement of elements, and the disclosed techniques may be easily extended to various structures and layouts on semiconductor dies or packages. The synthesized performance level setting circuits 12(0-M) are shown corresponding to the functional blocks 18(0-M) respectively; however, it is to be understood that the configuration illustrated in FIG. 1 is for illustrative purposes only, and in some embodiments a single synthesized performance level setting circuit 12 may be shared between one or more CPU(s) 16 and/or functional blocks 18.

With continuing reference to FIG. 1, the integrated circuit 14 is integrated on a semiconductor die or package. A shared voltage rail 20 is derived from an external power source 22 and used to supply high voltage to the functional blocks 18(0-M) of the respective CPUs 16(0-M). The shared voltage rail 20 may be configured to carry high voltage, and is alternatively referred to herein as the first power source 20. The shared voltage rail 20 also feeds on-die voltage regulators 24(0-M), which are integrated on the semiconductor die or package comprising the CPUs 16(0-M) of the integrated circuit 14. In the illustrated embodiment, the on-die voltage regulators 24(0-M) are shown corresponding to the functional blocks 18(0-M) respectively. However, it will be understood that the configuration shown in FIG. 1 is for illustrative purposes only, and in some embodiments a single on-die voltage regulator 24 may be shared between one or more CPUs 16 and/or functional blocks 18.

As shown in FIG. 1, the on-die voltage regulators 24(0-M) are configured to convert the high voltage received from the shared voltage rail 20 to a low voltage output, which is driven on low voltage rails 26(0-M). As such, the on-die voltage regulators 24(0-M) are referred to herein as the second power sources 24(0-M). The individual voltage output values of these on-die voltage regulators 24(0-M) may be determined such that they meet the minimum voltage value requirements of the corresponding functional blocks 18(0-M). As is known in the art, one method of determining the minimum voltage requirements may be based on the minimum voltage required to support a specified operating frequency of the corresponding functional block 18. Skilled persons will recognize suitable variations of the above embodiments for particular circuit configurations.

The functional blocks 18(0-M) are connected to the first power source 20 and the second power sources 24(0-M) as shown in FIG. 1. High power switches 28(0-M) couple the functional blocks 18(0-M) to the shared voltage rail 20 forming the first power source 20; low power switches 30(0-M) couple the functional blocks 18(0-M) respectively to the low voltage rails 26(0-M) connected to the on-die voltage regulators 24(0-M) that form the second power sources 24(0-M). It is to be understood that neither power source is tied to a particular voltage. For example, the low voltage rails 26(0-M) may be programmed to provide voltage across a low voltage operating window, which may overlap with a voltage operating window of the high voltage shared voltage rail 20.

Internal clocks 32(0-M) supply clock pulses at specified operating frequencies to respective functional blocks 18(0-M) for executing computational tasks. In some embodiments, the operating frequency of each internal clock 32(0-M) may be based on an external reference clock source (not shown), such as a front side bus (FSB) clock, wherein the operating frequency of each internal clock 32(0-M) results from multiplying the reference clock source by a given clock multiplier. In other embodiments, each of internal clocks 32(0-M) may generate clock pulses independent of other internal and/or external clock sources. The operating frequency of each of the internal clocks 32(0-M) may be modified to provide a lower or higher clock frequency to the corresponding functional blocks 18(0-M). It is to be understood that the maximum clock frequency that may be provided by each internal clock 32(0-M) to a corresponding functional block 18(0-M) is dependent on the voltage supplied to the functional block 18(0-M), wherein a higher supply voltage may support a higher operating frequency.

As noted above, the processor-based system 10 may include synthesized performance level setting circuits 12(0-M) for setting performance modes associated with the respective functional blocks 18(0-M). For example, consider a particular one of the functional blocks 18(0-M), referred to here as functional block 18$_0$. If a performance mode input indicating a high performance mode is received by the synthesized performance level setting circuit 12$_0$ of the function block 18$_0$, the synthesized performance level setting circuit 12$_0$ may select the first power source 20 to provide power to the functional block 18$_0$ at a first voltage level by, for example, switching on the high power switch 28$_0$ and switching off the low power switch 30$_0$. The synthesized performance level setting circuit 12$_0$ may also select a first clock frequency associated with the first voltage level. Similarly, if a performance mode input indicating a low performance mode is received by the synthesized performance level setting circuit 12$_0$, the synthesized performance level setting circuit 12$_0$ may select the second power source 24$_0$ to provide power to the functional block 18$_0$ at a second voltage level lower than the first voltage level by, for instance, switching on the low power switch 30$_0$ and switching off the high power switch 28$_0$. The synthesized performance level setting circuit 12$_0$ may also select a second clock frequency associated with the second voltage level that is lower than the first clock frequency.

However, the optimal performance level for the functional block 18$_0$ to complete a given computational task may fall between the high performance level afforded by the first voltage level and the first clock frequency, and the low performance level provided by the second voltage level and the second clock frequency. For example, the functional block 12$_0$ may be able to operate at a high performance level with a clock frequency of 1 GHz at a voltage level of 1.1 v, and at a low performance level with a clock frequency of 500 MHz at a voltage level of 600 mv. The most optimal performance level for a given computational task, though, may require a clock frequency of 750 MHz, which lies between the high performance level and the low performance level.

Accordingly, in order to provide a more efficient performance level for the functional block 18$_0$, the synthesized performance level setting circuit 12$_0$ may automatically alternate the functional block 18$_0$ between a high performance level and a low performance level to synthesize an intermediate performance level. The synthesized performance level setting circuit 12$_0$ may select the first power source and the first clock frequency to operate the functional block 18$_0$ at a high performance level for a first predefined time period. The synthesized performance level setting circuit 12$_0$ may then select the second power source and the second clock frequency to operate the functional block 18$_0$ at a low performance level for a second predefined time period. In this way, the synthesized performance level setting circuit 12$_0$ may allow the functional block 18$_0$ to operate at an intermediate performance level that is the average of the high performance level over the first predefined time period and the low performance level over the second predefined time period, and that approaches the optimal performance level for the given computational task.

One of skill in the art will appreciate that, to achieve a desired intermediate performance level, an appropriate high performance mode timer value and low performance mode timer value may be readily calculated if a first voltage level and a first clock frequency for a high performance mode and a second voltage level and a second clock frequency for a low performance mode are known. For instance, if the high performance mode timer value and the low performance mode timer value are the same, then the functional block 18$_0$ will spend approximately the same amount of time operating in a high performance mode and a low performance mode. As a result, the average clock frequency for the intermediate performance mode will approximate the average of the high performance mode clock frequency and the low performance mode clock frequency. In the example discussed above, an intermediate performance level with an average clock frequency of 750 MHz may be synthesized by alternating between the high performance level with a clock frequency of 1 GHz at a voltage level of 1.1 v and the low performance level with a clock frequency of 500 MHz at a voltage level of 600 mv for equal time intervals. By varying the high performance mode timer value and the low performance timer value, virtually any intermediate performance level may be synthesized.

Figure 2:
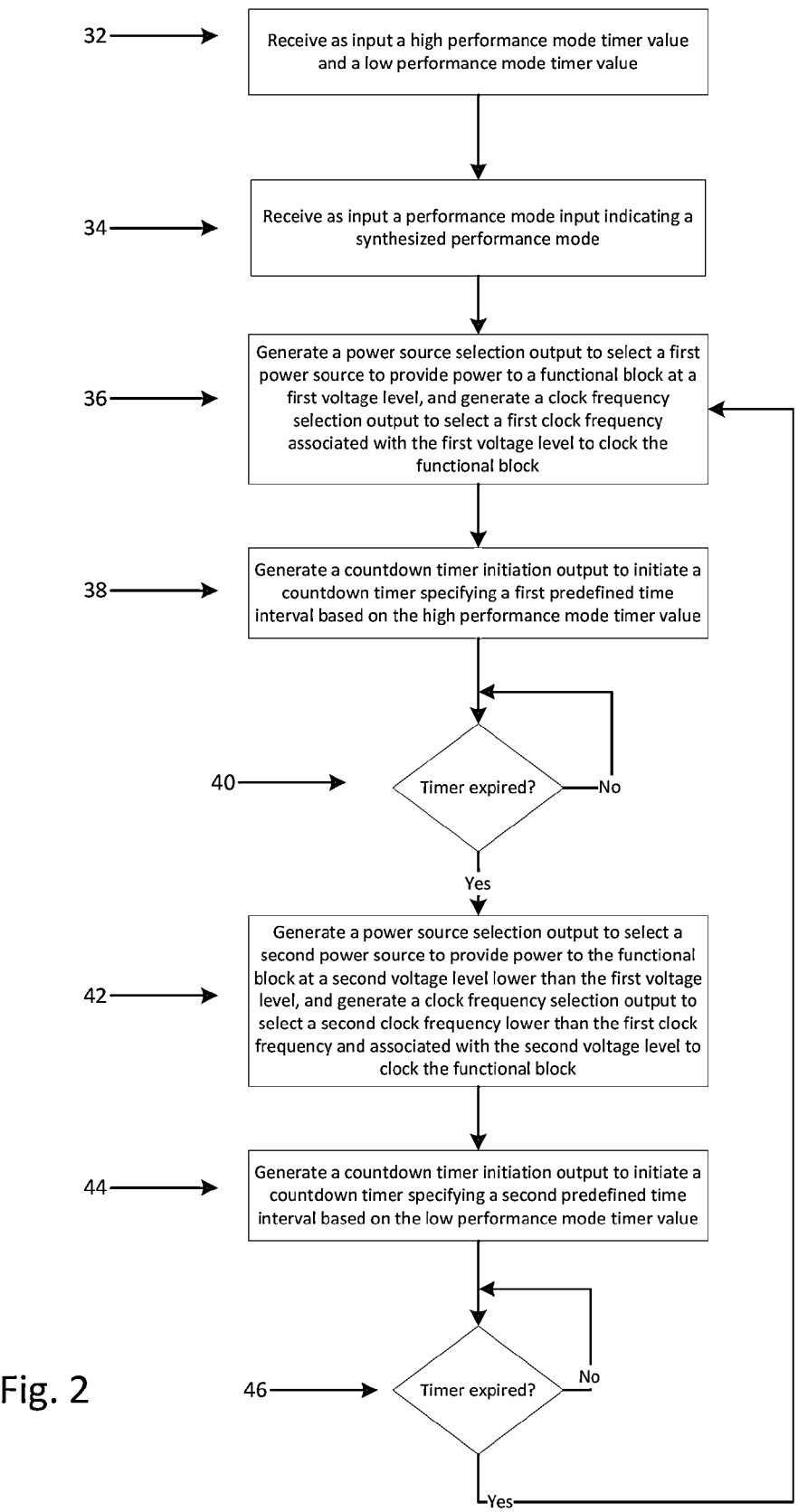
FIG. 2 is a flowchart illustrating an exemplary operational flow of synthesizing an intermediate performance level for a functional block of an integrated circuit, according to exemplary embodiments.

To illustrate an exemplary process for a given synthesized performance level setting circuit 12$_0$ configured to synthesize an intermediate performance level in the corresponding functional block 18$_0$ in the processor-based system 10 of FIG. 1, FIG. 2 is provided. In this example, synthesis begins by the synthesized performance level setting circuit 12$_0$ receiving a high performance mode timer value and a low performance mode timer value as input (block 32 of FIG. 2). The high performance mode timer value and the low performance mode timer value define time periods in which the functional block $18_0$ will operate as it alternates between a high performance mode and a low performance mode to synthesize a desired intermediate performance level.

The synthesized performance level setting circuit $12_0$ next receives as input a performance mode input indicating a synthesized performance mode (block 34 of FIG. 2). In response, the synthesized performance level setting circuit $12_0$ generates a power source selection output to select a first power source to provide power to the functional block $18_0$ at a first voltage level, and generates a clock frequency setting output to select a first clock frequency associated with the first voltage level to clock the functional block $18_0$ (block 36 of FIG. 2). The synthesized performance level setting circuit $12_0$ then generates a countdown timer initiation output to initiate a countdown timer specifying a first predefined time interval based on the high performance mode timer value (block 38 of FIG. 2). The countdown timer counts down until expiration (block 40 of FIG. 2).

Upon expiration of the countdown timer, the synthesized performance level setting circuit $12_0$ generates the power source selection output to select a second power source to provide power to the functional block $18_0$ at a second voltage level lower than the first voltage level, and generates a clock frequency selection output to select a second clock frequency lower than the first clock frequency and associated with the second voltage level to clock the functional block $18_0$ (block 42 of FIG. 2). The synthesized performance level setting circuit $12_0$ then generates a countdown timer initiation output to initiate a countdown timer specifying a second predefined time interval based on the low performance mode timer value (block 44 of FIG. 2). The countdown timer counts down until expiration (block 46 of FIG. 2), at which point processing resumes at block 36 of FIG. 2.

Figure 3:
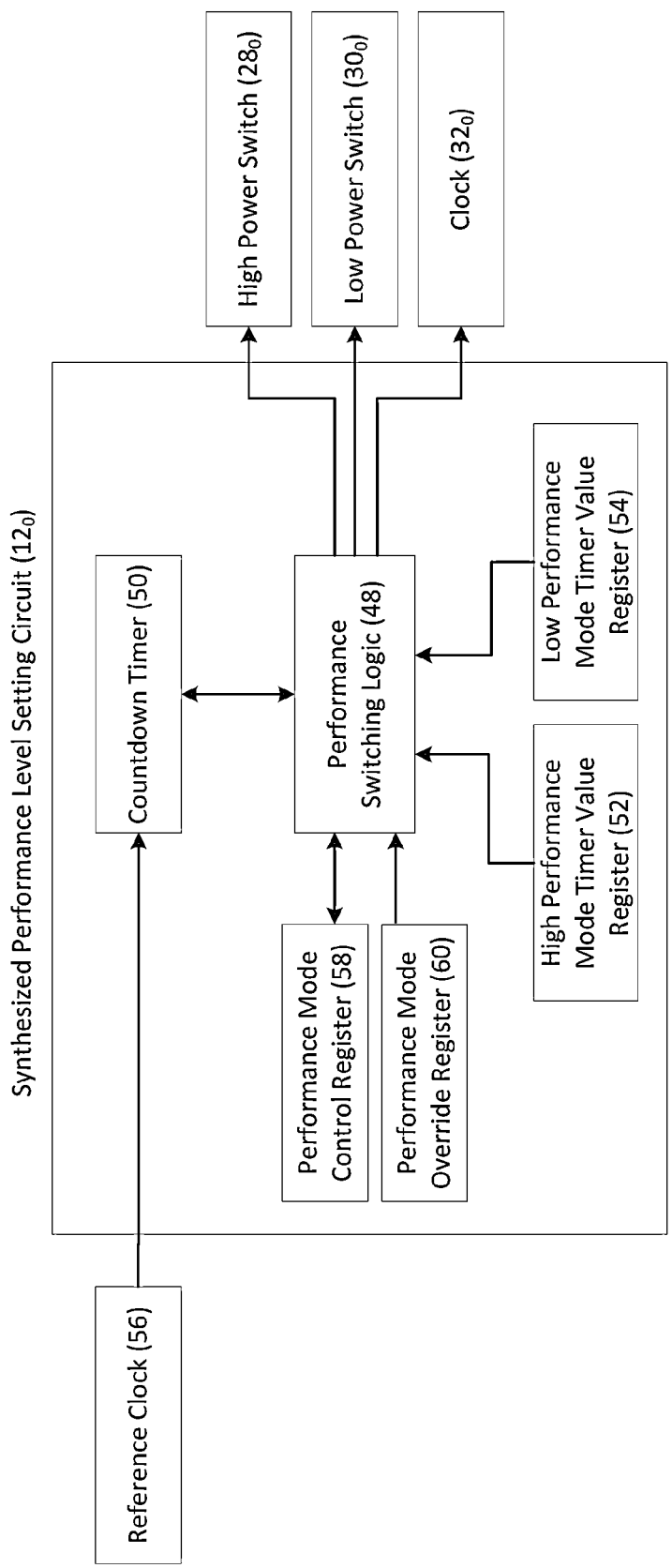
FIG. 3 is a block diagram of an exemplary synthesized performance level setting circuit for synthesizing an intermediate performance level for a functional block of an integrated circuit.

FIG. 3 illustrates a block diagram of an exemplary synthesized performance level setting circuit $12_0$, configured to carry out intermediate performance level synthesis operations with respect to the corresponding functional block $18_0$ of FIG. 1. In this regard, the synthesized performance level setting circuit $12_0$ comprises performance switching logic 48, which is communicatively coupled to the high power switch $28_0$, the low power switch $30_0$, and the internal clock $32_0$ of the functional block $18_0$. To select a power source and an operating clock frequency of the functional block $18_0$, the performance switching logic 48 generates a power source selection output to the high power switch $28_0$ and the low power switch $30_0$, and further generates a clock frequency selection output to the internal clock $32_0$ to select an operating frequency corresponding to the voltage level supplied by the selected power source.

The synthesized performance level setting circuit $12_0$ further includes a countdown timer 50, a high performance mode timer value register 52, and a low performance mode timer value register 54, all of which are communicatively coupled to the performance switching logic 48. In some embodiments, the performance switching logic 48 generates a countdown timer initiation output to the countdown timer 50 to load a value from the high performance mode timer value register 52 and/or the low performance mode timer value register 54 and initiate a countdown based on the loaded value. In some embodiments, a value may be written to the high performance mode timer value register 52 and/or the low performance mode timer value register 54 by a circuit or software process external to the synthesized performance level setting circuit $12_0$. The performance switching logic 48 may be configured to receive an indication when the countdown timer 50 expires.

The countdown timer 50 may be based on clock pulses received from a reference clock 56 (such as an Advanced High-performance Bus (AHB) clock) external to the synthesized performance level setting circuit $12_0$.

The synthesized performance level setting circuit $12_0$ may also include a performance mode control register 58 and a performance mode override register 60, each communicatively coupled to the performance switching logic 48. In some embodiments, a performance mode input indicating a selected performance mode may be received by the performance mode control register 58 from a circuit or software process external to the synthesized performance level setting circuit $12_0$. Some embodiments described herein may provide that the performance mode override register 60 may be triggered by the occurrence of a predefined condition, such as, for example, an execution pipeline stall condition, an outstanding memory access condition, a low processor utilization, and/or a high processor utilization, among other conditions.

Figure 4A:
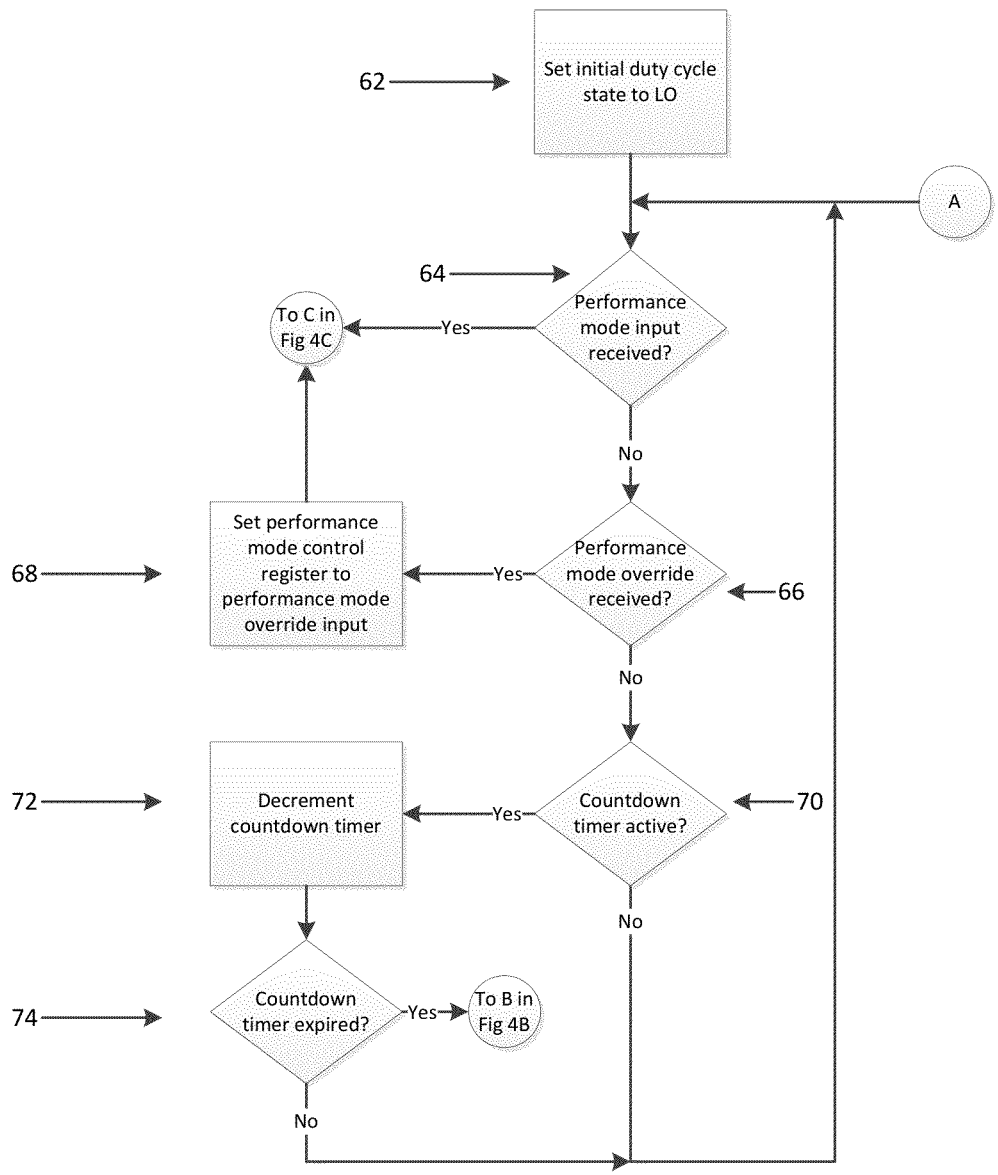
FIGS. 4A-4C are flowcharts detailing an exemplary process for a synthesized performance level setting circuit receiving a performance mode input, and selecting a power source and corresponding clock frequency in response to the performance mode input.
Figure 4B:
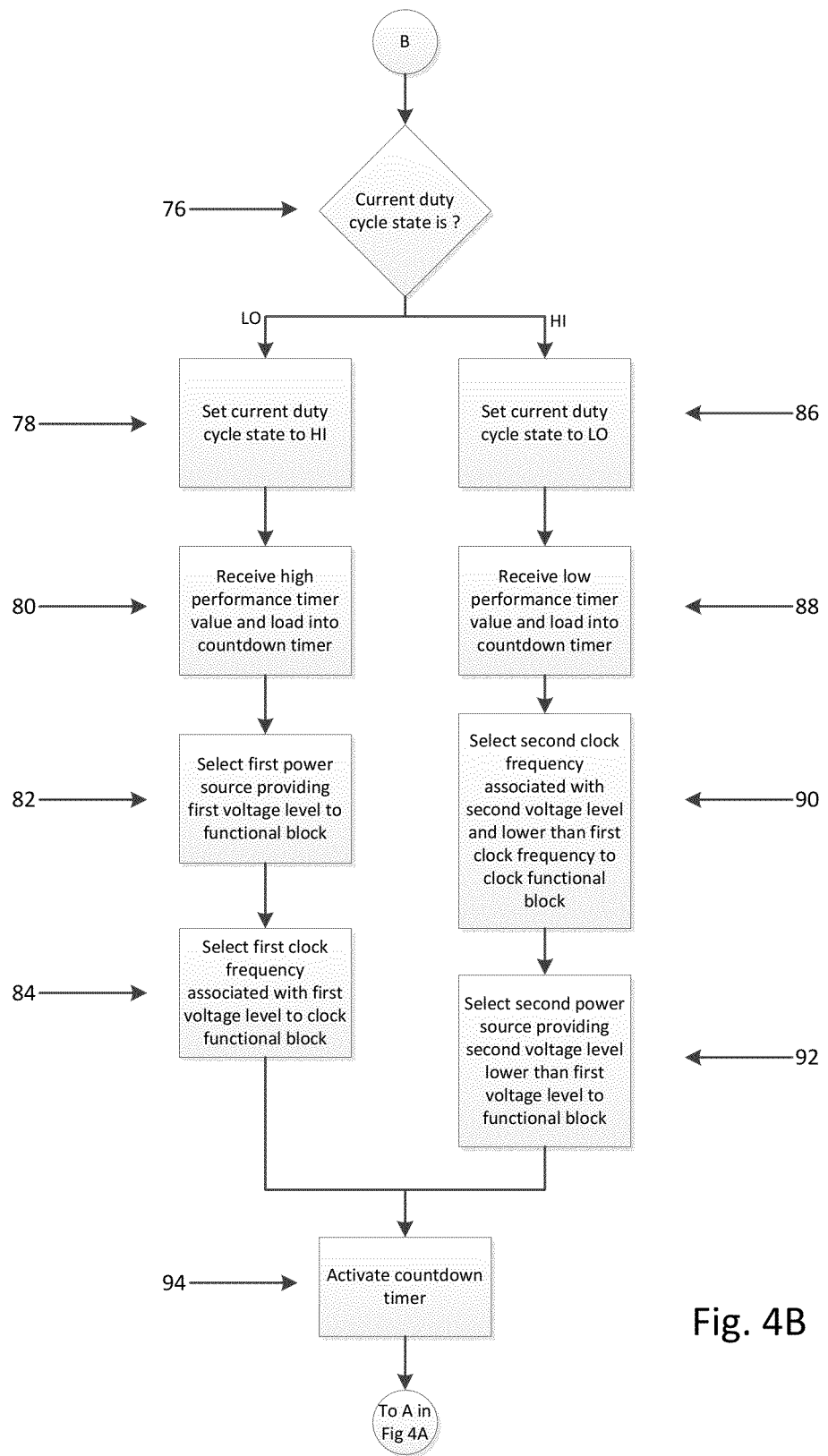
Figure 4C:
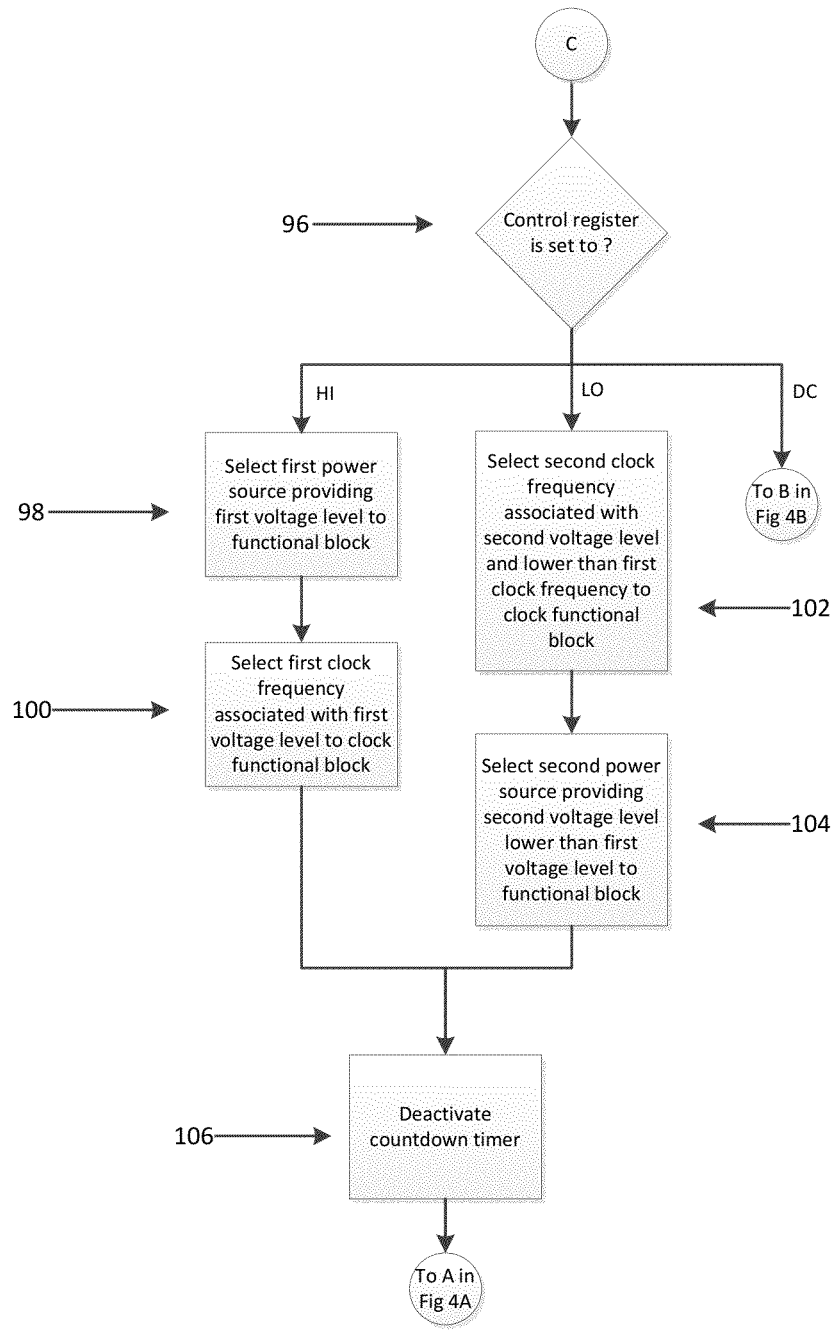

To illustrate a more detailed exemplary process for a synthesized performance level setting circuit (e.g., the synthesized performance level setting circuit(s) 12(0-M) of FIG. 1) receiving a performance mode input and selecting a power source and corresponding clock frequency in response to the performance mode input, FIGS. 4A-4C are provided. FIG. 4A details a process for initializing the synthesized performance level setting circuit and carrying out a primary processing loop, including receiving a performance mode input and monitoring a countdown timer. FIG. 4B illustrates operations for implementing a "duty cycle" in which a functional block, such as one of the functional blocks 18(0-M) of FIG. 1, is alternated between a high performance level and a low performance level to synthesize an intermediate performance level. FIG. 4C shows operations for setting the functional block to one of a fixed high performance mode and a low performance mode.

The process in this example begins in FIG. 4A with the synthesized performance level setting circuit being initialized by setting an initial duty cycle state to LO, indicating a low performance level (block 62 of FIG. 4A). In some embodiments, the duty cycle state is tracked by performance switching logic (such as the performance switching logic 48 of FIG. 3), and is used to determine the next performance level into which the functional block will be switched when alternating between a high performance level and a low performance level. The synthesized performance level setting circuit then enters the primary processing loop by first determining whether a performance mode input has been received (block 64 of FIG. 4A). If so, processing proceeds to block 96 in FIG. 4C to effect a change in the performance mode of the functional block; if not, processing continues to block 66 of FIG. 4A, where the synthesized performance level setting circuit determines whether a performance mode override input has been received (block 66 of FIG. 4A). The performance mode override input may be received, for instance, from a performance mode override register (such as the performance mode override register 60 of the synthesized performance level setting circuit $12_0$ of FIG. 3). In some embodiments, the performance mode override input may be triggered by the occurrence of a predefined condition within an integrated circuit (e.g., the integrated circuit 14 of FIG. 1). Such predefined conditions may include, for example, an execution pipeline stall condition, an outstanding memory access condition, a low processor utilization, and/or a high processor utilization, among other conditions.

Upon occurrence of the predefined condition, it may be desirable for the functional block to automatically revert to either a high performance level or a low performance level, in effect overriding any fixed or synthesized performance level settings that may be in effect at the time the predefined condition occurs. Accordingly, if a performance mode override input is received indicating either a high performance mode or a low performance mode, a performance mode control register (e.g., the performance mode control register 58 of the synthesized performance level setting circuit $12_0$ of FIG. 3) may be set to the performance mode override input, indicating that the functional block is to be switched to the corresponding high or low override performance level (block 68 of FIG. 4A). Processing then continues at block 96 of FIG. 4C, where the performance level of the functional block is modified accordingly.

If it is determined at block 66 of FIG. 4A that no performance mode override signal is received, the synthesized performance level setting circuit next determines whether a countdown timer is currently active (block 70 of FIG. 4A). If the countdown timer is active, then the synthesized performance level setting circuit is currently executing a duty cycle (i.e., maintaining the functional block in a high performance level or a low performance level so as to synthesize an intermediate performance level). If so, the countdown timer is decremented (block 72 of FIG. 4A), and the synthesized performance level setting circuit checks whether the countdown timer has expired (block 74 of FIG. 4A). If the countdown timer has expired, the duty cycle has concluded, and processing proceeds to block 76 of FIG. 4B to alternate the performance mode of the functional block. If the countdown timer has not expired, processing returns to block 64 of FIG. 4A, and the primary processing loop begins again.

FIG. 4B details operations for implementing a duty cycle for the functional block to synthesize an intermediate performance level. The synthesized performance level setting circuit first examines the current duty cycle state to determine whether the functional block is presently operating in a low performance mode (indicated by a duty cycle state of LO) or a high performance mode (indicated by a duty cycle state of HI) (block 76 of FIG. 4B). If the current duty cycle state is LO, then the synthesized performance level setting circuit proceeds with setting the functional block into a high performance mode. The synthesized performance level setting circuit sets the current duty cycle state to HI to reflect the most current state of the functional block (block 78 of FIG. 4B). Next, the synthesized performance level setting circuit receives a high value performance mode timer value, and loads the high performance mode timer value into the countdown timer (block 80 of FIG. 4B). The high performance mode timer value may be received from, for instance, a register such as the high performance mode timer value register 52 of the synthesized performance level setting circuit $12_0$ of FIG. 3. The synthesized performance level setting circuit then selects a first power source to provide power to the functional block at a first voltage level (block 82 of FIG. 4B), and selects a first clock frequency associated with the first voltage to clock the functional block (block 84 of FIG. 4B).

Returning to the decision block 76 of FIG. 4B, if the current duty cycle state is determined to be HI, indicating that the functional block is presently in a high performance mode, then the synthesized performance level setting circuit proceeds with reverting the functional block to a low performance mode. The synthesized performance level setting circuit first sets the current duty cycle state to LO to reflect the most current state of the functional block (block 86 of FIG. 4B). The synthesized performance level setting circuit then receives a low performance mode timer value (from, for instance, a register such as the low performance mode timer value register 54 of the synthesized performance level setting circuit $12_0$ of FIG. 3), and loads the low performance mode timer value into the countdown timer (block 88 of FIG. 4B). The synthesized performance level setting circuit selects a second frequency lower than the first frequency and associated with a second voltage to clock the functional block (block 90 of FIG. 4B), and selects a second power source to provide power to the functional block at a second voltage level lower than the first voltage level (block 92 of FIG. 4B). Once the performance mode of the functional block has been set (either from a low performance level to a high performance level or vice versa), the synthesized performance level setting circuit activates the countdown timer (block 94 in FIG. 4B), and processing continues at block 64 of FIG. 4A.

Note that in some embodiments, during the switchover period in which the functional block is switched from a high performance mode to a low performance mode, it may be necessary to switch from a first clock frequency to a second clock frequency prior to switching from a first voltage level to a second voltage level. This is to ensure that there is sufficient voltage to support the selected clock frequency. As discussed in more detail with respect to FIG. 5, this may result in the ratio of time that the functional block remains in the low performance mode relative to the time that the functional block remains in the high performance mode being slightly larger than the ratio of the low performance mode timer value to the high performance mode timer value.

As discussed above with respect to blocks 64 and 68 of FIG. 4A, if either a performance mode input or a performance mode override input is received by the synthesized performance level setting circuit, processing proceeds to block 96 of FIG. 4C. FIG. 4C illustrates an exemplary process for switching the functional block between performance modes as indicated by the performance mode input. The synthesized performance level setting circuit examines the contents of the performance mode control register to determine the desired performance mode. If the performance mode control register is set to DC (indicating "duty cycle" mode for synthesizing an intermediate performance level), processing continues at block 76 of FIG. 4B, as discussed above.

If the performance mode control register is set to HI (indicating a high performance level), the synthesized performance level setting circuit selects a first power source to provide power to the functional block at a first voltage level (block 98 of FIG. 4C), and selects a first clock frequency associated with the first voltage to clock the functional block (block 100 of FIG. 4C). If the performance mode control register is set to LO (indicating a low performance level), the synthesized performance level setting circuit selects a second frequency lower than the first frequency associated with the second voltage to clock the functional block (block 102 of FIG. 4C), and selects a second power source to provide power to the functional block at a second voltage level lower than the first voltage level (block 104 of FIG. 4C). Once the performance mode of the functional block has been set (either from a low performance mode to a high performance mode or vice versa), the synthesized performance level setting circuit deactivates the countdown timer (block 106 in FIG. 4C), and processing continues at block 64 of FIG. 4A.

Figure 5:
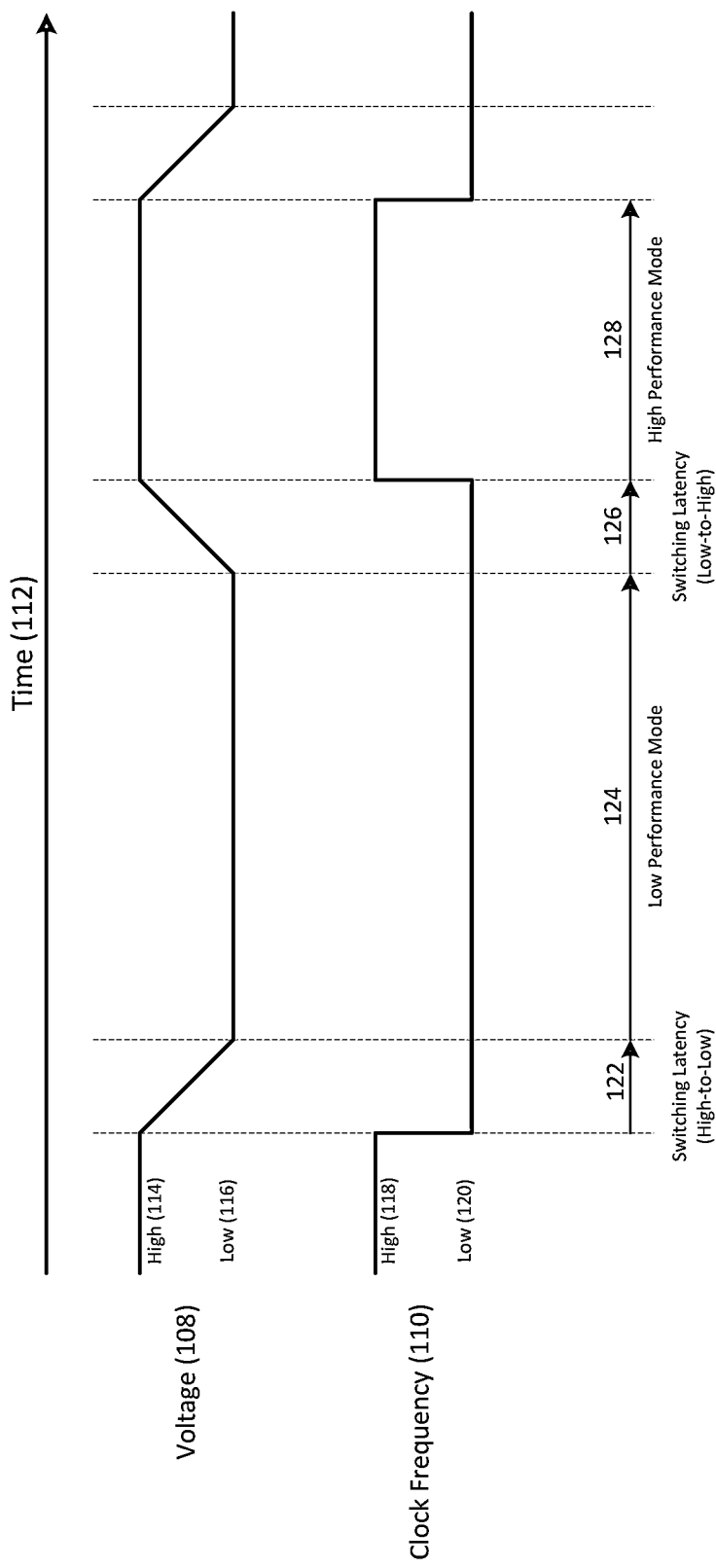
FIG. 5 is a diagram showing comparative voltage and frequency levels in a synthesized performance level setting circuit during synthesis of an intermediate performance level for a functional block of an integrated circuit.

During execution of duty cycles for synthesizing an intermediate performance level for a functional block, voltage level and clock frequency selected for the functional block by the synthesized performance level setting circuit are alternated between a first voltage level and a first clock frequency associated with the first voltage level, and a second voltage level lower than the first voltage level and a second clock frequency associated with the second voltage level and lower than the first clock frequency. To illustrate exemplary comparative voltage and clock frequency levels in a synthesized performance level setting circuit during synthesis of an intermediate performance level for a functional block of an integrated circuit, FIG. 5 is provided. In FIG. 5, a voltage level 108 and a clock frequency level 110 are provided to a functional block (e.g., one of the functional blocks 18(0-M) of FIG. 1) over a period of time 112. The voltage level 108 may be switched between a high voltage level 114 and a low voltage level 116, corresponding to voltage levels provided by a first power source such as the shared voltage rail 20 of FIG. 1 and a second power source such as one of the on-die voltage regulators 24(0-M) of FIG. 1, respectively. Similarly, the clock frequency level 110 may be switched between a high clock frequency level 118 corresponding to a maximum clock frequency supported by the high voltage level 114, and a low clock frequency level 120 corresponding to a maximum clock frequency supported by the low voltage level 116.

The example illustrated in FIG. 5 begins with the functional block operating in a high performance mode wherein the voltage level 108 being provided to the functional block is set at the high voltage level 114 provided by the first power source, and the clock frequency level 110 at which the functional block is being clocked is set at the high clock frequency level 118. When the high performance mode duty cycle is complete, the synthesized performance level setting circuit initiates the low performance mode duty cycle during a period of time 112, referred to herein as a high-to-low switching latency period 122. At the start of the high-to-low switching latency period 122, the synthesized performance level setting circuit selects the low clock frequency level 120 to clock the functional block. The synthesized performance level setting circuit then selects the low voltage level 116 provided by the second power source during the high-to-low switching latency period 122. It is to be understood that, when switching from a high performance level to a low performance level, it may be necessary for the synthesized performance level setting circuit to select the low clock frequency level 120 prior to selecting the low voltage level 116 in order to ensure that the functional block receives a sufficient voltage level to support the selected clock frequency level. After the high-to-low switching latency period 122 concludes, the functional block operates in a low performance mode for a predefined time period 124. In some embodiments, the predefined time period 124 is determined by a countdown timer that is initiated by the synthesized performance level setting circuit using a low performance mode timer value.

At the conclusion of the low performance mode duty cycle, the synthesized performance level setting circuit initiates the high performance mode duty cycle during a period of time referred to herein as a low-to-high switching latency period 126. When the low-to-high switching latency period 126 begins, the synthesized performance level setting circuit first selects the high voltage level 114 provided by the first power source. The synthesized performance level setting circuit then selects the high clock frequency level 118 to clock the functional block. As appreciated by a skilled artisan, it may be necessary for the synthesized performance level setting circuit to select the high voltage level 114 prior to selecting the high clock frequency level 118 to ensure that the functional block receives a sufficient voltage level to support the selected clock frequency level. After the low-to-high switching latency period 126 concludes, the functional block operates in a high performance mode for a predefined time period 128. Some embodiments may provide that the predefined time period 128 is determined by a countdown timer that is initiated by the synthesized performance level setting circuit using a high performance mode timer value.

When the high performance mode duty cycle concludes, the synthesized performance level setting circuit then initiates a low performance mode duty cycle, as described above. In some embodiments, this process repeats until the synthesized performance level setting circuit receives a performance mode input indicating a change in the performance mode, or until the synthesized performance level setting circuit receives a performance mode override input.

The synthesized performance level setting circuit according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
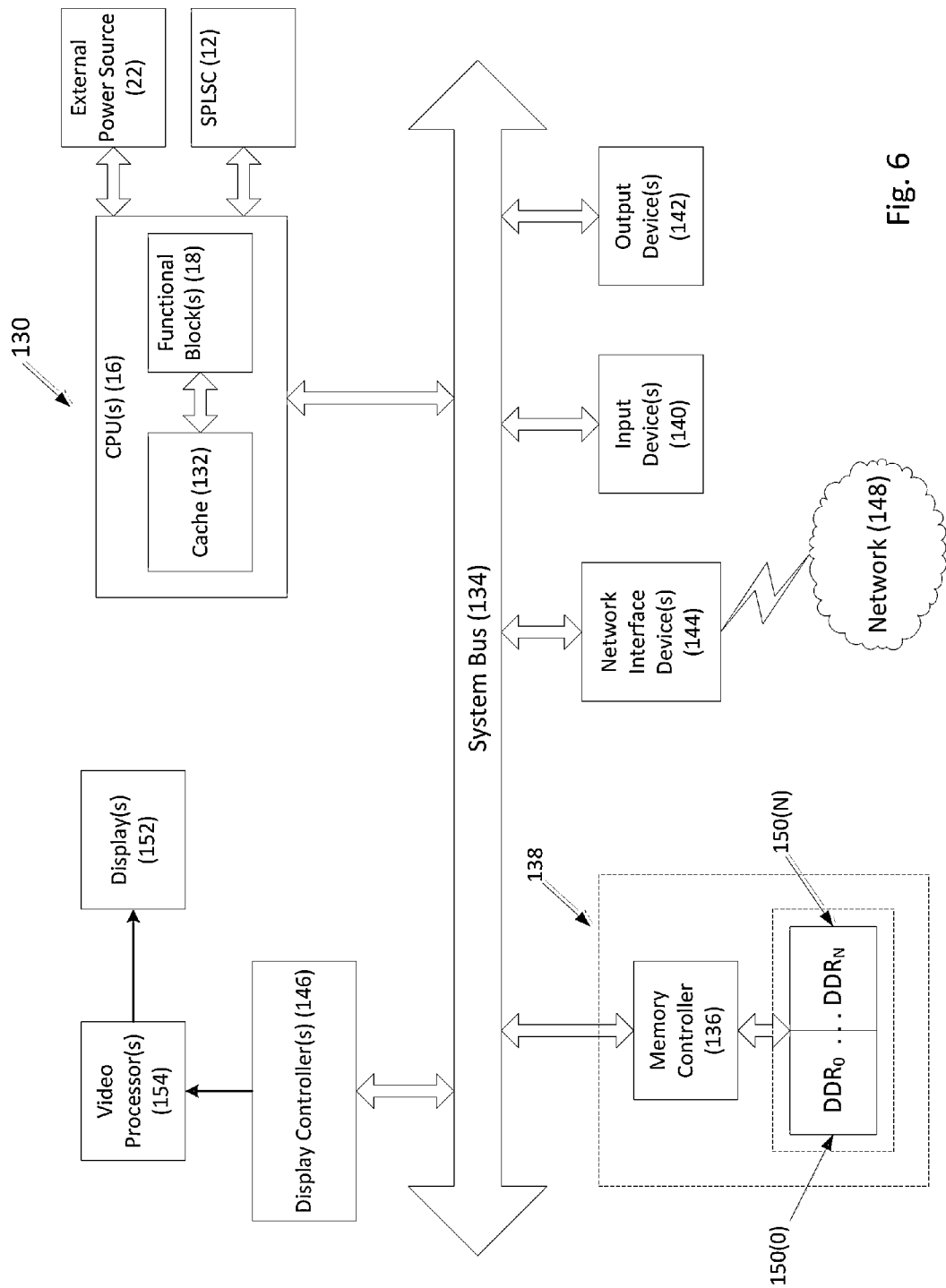
FIG. 6 is a diagram of an exemplary processor-based system that can include instruction processing circuits, including the synthesized performance level setting circuit of FIG. 1, configured to detect and eliminate redundant masking operations.

In this regard, FIG. 6 illustrates an example of a processor-based system 130 that can employ one or more of the synthesized performance level setting circuits 12(0-M) illustrated in FIG. 1. In this example, the processor-based system 130 includes the one or more CPU(s) 16 of FIG. 1, each including one or more functional blocks 18 and connected to an external power source 22. The CPU(s) 16 is communicatively coupled to synthesized performance level setting circuit(s) (SPLSC) 12. The CPU(s) 16 may have cache memory 132 coupled to the functional block(s) 18 for rapid access to temporarily stored data. The CPU(s) 16 is coupled to a system bus 134 and can intercouple master and slave devices included in the processor-based system 130. As is well known, the CPU(s) 16 communicates with these other devices by exchanging address, control, and data information over the system bus 134. For example, the CPU(s) 16 can communicate bus transaction requests to a memory controller 136, as an example of a slave device. Although not illustrated in FIG. 6, multiple system buses 134 could be provided.

Other master and slave devices can be connected to the system bus 134. As illustrated in FIG. 6, these devices can include a memory system 138, one or more input devices 140, one or more output devices 142, one or more network interface devices 144, and one or more display controllers 146, as examples. The input device(s) 140 can include any type of input device, including but not limited to input keys, switches, voice processors, etc. The output device(s) 142 can include any type of output device, including but not limited to audio, video, other visual indicators, etc. The network interface device(s) 144 can be any device(s) configured to allow exchange of data to and from a network 148. The network 148 can be any type of network, including but not limited to a wired or wireless network, a private or public network, a local area network (LAN), a wide local area network (WLAN), and the Internet. The network interface device(s) 144 can be configured to support any type of communication protocol desired. The memory system 138 can include one or more memory units 150(0-N).

The CPU(s) 16 may also be configured to access the display controller(s) 146 over the system bus 134 to control information sent to one or more displays 152. The display controller(s) 146 sends information to the display(s) 152 to be displayed via one or more video processors 154, which process the information to be displayed into a format suitable for the display(s) 152. The display(s) 152 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A synthesized performance level setting circuit configured to synthesize an intermediate performance level for a functional block of an integrated circuit, the synthesized performance level setting circuit configured to:
   receive as input a performance mode input; and
   responsive to receiving the performance mode input indicating a synthesized performance mode:
      generate a power source selection output to select a first power source to provide power to the functional block at a first voltage level for a first predefined time interval, and generate a clock frequency setting output to select a first clock frequency associated with the first voltage level to clock the functional block for the first predefined time interval; and
      generate the power source selection output to select a second power source to provide power to the functional block at a second voltage level lower than the first voltage level for a second predefined time interval, and generate the clock frequency setting output to select a second clock frequency lower than the first clock frequency and associated with the second voltage level to clock the functional block for the second predefined time interval;
   receive as input a performance mode override input triggered by a predefined condition within the integrated circuit and indicating a high performance mode; and
   responsive to receiving the performance mode override input indicating the high performance mode:
      generate the power source selection output to select the first power source to provide power to the functional block at the first voltage level, and generate the clock frequency setting output to select the first clock frequency associated with the first voltage level to clock the functional block.

2. The synthesized performance level setting circuit of claim 1, further configured to:
   receive as input a high performance mode timer value and a low performance mode timer value;
   responsive to receiving the high performance mode timer value and the low performance mode timer value:
      generate a first countdown timer initiation output initiating a countdown timer for the first predefined time interval based on the high performance mode timer value; and
      generate a second countdown timer initiation output initiating the countdown timer for the second predefined time interval based on the low performance mode timer value.

3. The synthesized performance level setting circuit of claim 1 further configured to:

responsive to receiving the performance mode override input indicating the high performance mode:
   generate the power source selection output to select the first power source to provide power to the functional block at the first voltage level, and generate the clock frequency setting output to select the first clock frequency associated with the first voltage level to clock the functional block.

4. The synthesized performance level setting circuit of claim 1 further configured to:
responsive to receiving the performance mode override input indicating a low performance mode:
   generate the power source selection output to select the second power source to provide power to the functional block at the second voltage level lower than the first voltage level, and generate the clock frequency setting output to select the second clock frequency lower than the first clock frequency and associated with the second voltage level to clock the functional block.

5. The synthesized performance level setting circuit of claim 1 configured to:
receive as the input the performance mode override input triggered by the predefined condition within the integrated circuit and indicating a low performance mode;
responsive to receiving the performance mode override input indicating the low performance mode:
   generate the power source selection output to select the second power source to provide power to the functional block at the second voltage level lower than the first voltage level, and generate the clock frequency setting output to select the second clock frequency lower than the first clock frequency and associated with the second voltage level to clock the functional block.

6. The synthesized performance level setting circuit of claim 1 configured to generate the power source selection output to select a shared high voltage rail coupled to a high voltage source outside the integrated circuit as the first power source.

7. The synthesized performance level setting circuit of claim 1 configured to generate the power source selection output to select a shared high voltage rail coupled to a high voltage source outside the integrated circuit as the second power source.

8. The synthesized performance level setting circuit of claim 1 configured to generate the power source selection output to select an on-die voltage regulator integrated on a same die as the integrated circuit as the second power source.

9. The synthesized performance level setting circuit of claim 1 configured to receive as the input the performance mode override input indicating the high performance mode triggered by a high processor utilization condition.

10. The synthesized performance level setting circuit of claim 5 configured to receive as the input the performance mode override input indicating the low performance mode triggered by the predefined condition selected from the group consisting of an execution pipeline stall condition, an outstanding memory access condition, and a low processor utilization condition.

11. The synthesized performance level setting circuit of claim 1 integrated into a semiconductor die.

12. The synthesized performance level setting circuit of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

13. A synthesized performance level setting circuit configured to synthesize an intermediate performance level for a functional block of an integrated circuit, the synthesized performance level setting circuit comprising:
   a means for receiving as input a performance mode input;
   a means for determining that the performance mode input indicates a synthesized performance mode;
   a means for selecting a first power source to provide power to the functional block at a first voltage level for a first predefined time interval, and selecting a first clock frequency associated with the first voltage level to clock the functional block for the first predefined time interval, responsive to a determination that the performance mode input indicates the synthesized performance mode;
   a means for selecting a second power source to provide power to the functional block at a second voltage level lower than the first voltage level for a second predefined time interval, and selecting a second clock frequency lower than the first clock frequency and associated with the second voltage level to clock the functional block for the second predefined time interval, responsive to the determination that the performance mode input indicates the synthesized performance mode;
   a means for receiving a performance mode override input triggered by a predefined condition within the integrated circuit and indicating a high performance mode; and
   a means for generating a power source selection output to select the first power source to provide power to the functional block at the first voltage level, and generating a clock frequency setting output to select the first clock frequency associated with the first voltage level to clock the functional block, responsive to receiving the performance mode override input indicating the high performance mode.

14. A method for synthesizing an intermediate performance level for a functional block of an integrated circuit, comprising:
   receiving as input a performance mode input; and
   responsive to receiving the performance mode input indicating a synthesized performance mode:
      selecting a first power source to provide power to the functional block at a first voltage level for a first predefined time interval, and selecting a first clock frequency associated with the first voltage level to clock the functional block for the first predefined time interval; and
      selecting a second power source to provide power to the functional block at a second voltage level lower than the first voltage level for a second predefined time interval, and selecting a second clock frequency lower than the first clock frequency and associated with the second voltage level to clock the functional block for the second predefined time interval;
   receiving as input a performance mode override input triggered by a predefined condition within the integrated circuit and indicating a high performance mode; and
   responsive to receiving the performance mode override input indicating the high performance mode:
      selecting the first power source to provide power to the functional block at the first voltage level, and selecting the first clock frequency associated with the first voltage level to clock the functional block.

15. The method of claim 14, further comprising:
receiving as input a high performance mode timer value and a low performance mode timer value;
initiating a countdown timer for the first predefined time interval based on the high performance mode timer value after selecting the first power source and selecting the first clock frequency; and
initiating the countdown timer for the second predefined time interval based on the low performance mode timer value after selecting the second power source and selecting the second clock frequency.

16. The method of claim 14 further comprising:
responsive to receiving the performance mode override input indicating the high performance mode:
selecting the first power source to provide power to the functional block at the first voltage level, and selecting the first clock frequency associated with the first voltage level to clock the functional block.

17. The method of claim 14 further comprising:
responsive to receiving the performance mode override input indicating a low performance mode:
selecting the second power source to provide power to the functional block at the second voltage level lower than the first voltage level, and selecting the second clock frequency lower than the first clock frequency and associated with the second voltage level to clock the functional block.

18. The method of claim 14 further comprising:
receiving as the input the performance mode override input triggered by the predefined condition within the integrated circuit and indicating a low performance mode; and
responsive to receiving the performance mode override input indicating the low performance mode:
selecting the second power source to provide power to the functional block at the second voltage level lower than the first voltage level, and selecting the second clock frequency lower than the first clock frequency and associated with the second voltage level to clock the functional block.

19. A non-transitory computer-readable medium having stored thereon computer-executable instructions to cause a processor to implement a method for synthesizing an intermediate performance level for a functional block of an integrated circuit, the method comprising:
receiving as input a performance mode input; and
responsive to receiving the performance mode input indicating a synthesized performance mode:
selecting a first power source to provide power to the functional block at a first voltage level for a first predefined time interval, and selecting a first clock frequency associated with the first voltage level to clock the functional block for the first predefined time interval; and
selecting a second power source to provide power to the functional block at a second voltage level lower than the first voltage level for a second predefined time interval, and selecting a second clock frequency lower than the first clock frequency and associated with the second voltage level to clock the functional block for the second predefined time interval;
receiving as input a performance mode override input triggered by a predefined condition within the integrated circuit and indicating a high performance mode; and responsive to receiving the performance mode override input indicating the high performance mode:
selecting the first power source to provide power to the functional block at the first voltage level, and selecting the first clock frequency associated with the first voltage level to clock the functional block.

20. The non-transitory computer-readable medium of claim 19 having stored thereon computer-executable instructions to cause the processor to implement the method further comprising:
receiving as input a high performance mode timer value and a low performance mode timer value;
initiating a countdown timer for the first predefined time interval based on the high performance mode timer value after selecting the first power source and selecting the first clock frequency; and
initiating the countdown timer for the second predefined time interval based on the low performance mode timer value after selecting the second power source and selecting the second clock frequency.

21. The non-transitory computer-readable medium of claim 19 having stored thereon computer-executable instructions to cause the processor to implement the method further comprising:
responsive to receiving the performance mode override input indicating the high performance mode:
selecting the first power source to provide power to the functional block at the first voltage level, and selecting the first clock frequency associated with the first voltage level to clock the functional block.

22. The non-transitory computer-readable medium of claim 19 having stored thereon computer-executable instructions to cause the processor to implement the method further comprising:
responsive to receiving the performance mode override input indicating a low performance mode:
selecting the second power source to provide power to the functional block at the second voltage level lower than the first voltage level, and selecting the second clock frequency lower than the first clock frequency and associated with the second voltage level to clock the functional block.

23. The non-transitory computer-readable medium of claim 19 having stored thereon computer-executable instructions to cause the processor to implement the method further comprising:
receiving as the input the performance mode override input triggered by the predefined condition within the integrated circuit and indicating a low performance mode; and
responsive to receiving the performance mode override input indicating the low performance mode:
selecting the second power source to provide power to the functional block at the second voltage level lower than the first voltage level, and selecting the second clock frequency lower than the first clock frequency and associated with the second voltage level to clock the functional block.

24. A synthesized performance level setting circuit configured to synthesize an intermediate performance level for a functional block of an integrated circuit, the synthesized performance level setting circuit configured to:
receive as input a performance mode input; and
responsive to receiving the performance mode input indicating a synthesized performance mode:
generate a power source selection output to select a first power source to provide power to the functional block at a first voltage level for a first predefined time interval, and generate a clock frequency setting output to select a first clock frequency associated with the first voltage level to clock the functional block for the first predefined time interval; and generate the power source selection output to select a second power source to provide power to the functional block at a second voltage level lower than the first voltage level for a second predefined time interval, and generate the clock frequency setting output to select a second clock frequency lower than the first clock frequency and associated with the second voltage level to clock the functional block for the second predefined time interval;

receive as input a performance mode override input triggered by a predefined condition within the integrated circuit and indicating a low performance mode; and responsive to receiving the performance mode override input indicating the low performance mode:

generate the power source selection output to select the second power source to provide power to the functional block at the second voltage level lower than the first voltage level, and generate the clock frequency setting output to select the second clock frequency lower than the first clock frequency and associated with the second voltage level to clock the functional block.

25. The synthesized performance level setting circuit of claim 24 further configured to:

receive as the input a high performance mode timer value and a low performance mode timer value; and responsive to receiving the high performance mode timer value and the low performance mode timer value:

generate a first countdown timer initiation output initiating a countdown timer for the first predefined time interval based on the high performance mode timer value; and generate a second countdown timer initiation output initiating the countdown timer for the second predefined time interval based on the low performance mode timer value.

26. The synthesized performance level setting circuit of claim 24 further configured to:

responsive to receiving the performance mode override input indicating the high performance mode:

generate the power source selection output to select the first power source to provide power to the functional block at the first voltage level, and generate the clock frequency setting output to select the first clock frequency associated with the first voltage level to clock the functional block.

27. The synthesized performance level setting circuit of claim 24 further configured to:

responsive to receiving the performance mode override input indicating a low performance mode:

generate the power source selection output to select the second power source to provide power to the functional block at the second voltage level lower than the first voltage level, and generate the clock frequency setting output to select the second clock frequency lower than the first clock frequency and associated with the second voltage level to clock the functional block.

28. The synthesized performance level setting circuit of claim 24 configured to generate the power source selection output to select a shared high voltage rail coupled to a high voltage source outside the integrated circuit as the first power source.

29. The synthesized performance level setting circuit of claim 24 configured to generate the power source selection output to select a shared high voltage rail coupled to a high voltage source outside the integrated circuit as the second power source.

30. The synthesized performance level setting circuit of claim 24 configured to generate the power source selection output to select an on-die voltage regulator integrated on a same die as the integrated circuit as the second power source.

31. The synthesized performance level setting circuit of claim 24 configured to receive as input the performance mode override input triggered by the predefined condition selected from the group consisting of an execution pipeline stall condition, an outstanding memory access condition, and a low processor utilization condition.

32. The synthesized performance level setting circuit of claim 24 integrated into a semiconductor die.

33. The synthesized performance level setting circuit of claim 24, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

34. A synthesized performance level setting circuit configured to synthesize an intermediate performance level for a functional block of an integrated circuit, the synthesized performance level setting circuit comprising:

a means for receiving as input a performance mode input;

a means for determining that the performance mode input indicates a synthesized performance mode;

a means for selecting a first power source to provide power to the functional block at a first voltage level for a first predefined time interval, and selecting a first clock frequency associated with the first voltage level to clock the functional block for the first predefined time interval, responsive to a determination that the performance mode input indicates the synthesized performance mode;

a means for selecting a second power source to provide power to the functional block at a second voltage level lower than the first voltage level for a second predefined time interval, and selecting a second clock frequency lower than the first clock frequency and associated with the second voltage level to clock the functional block for the second predefined time interval, responsive to the determination that the performance mode input indicates the synthesized performance mode;

a means for receiving as input a performance mode override input triggered by a predefined condition within the integrated circuit and indicating a low performance mode; and a means for selecting the second power source to provide power to the functional block at the second voltage level lower than the first voltage level, and selecting the second clock frequency lower than the first clock frequency and associated with the second voltage level to clock the functional block, responsive to receiving the performance mode override input.

35. A method for synthesizing an intermediate performance level for a functional block of an integrated circuit, comprising:
- receiving as input a performance mode input; and
- responsive to receiving the performance mode input indicating a synthesized performance mode:
  - selecting a first power source to provide power to the functional block at a first voltage level for a first predefined time interval, and selecting a first clock frequency associated with the first voltage level to clock the functional block for the first predefined time interval; and
  - selecting a second power source to provide power to the functional block at a second voltage level lower than the first voltage level for a second predefined time interval, and selecting a second clock frequency lower than the first clock frequency and associated with the second voltage level to clock the functional block for the second predefined time interval;
- receiving as input a performance mode override input triggered by a predefined condition within the integrated circuit and indicating a low performance mode; and
- responsive to receiving the performance mode override input indicating the low performance mode:
  - selecting the second power source to provide power to the functional block at the second voltage level lower than the first voltage level, and selecting the second clock frequency lower than the first clock frequency and associated with the second voltage level to clock the functional block.

36. The method of claim 35, further comprising:
- receiving as input a high performance mode timer value and a low performance mode timer value;
- initiating a countdown timer for the first predefined time interval based on the high performance mode timer value after selecting the first power source and selecting the first clock frequency; and
- initiating the countdown timer for the second predefined time interval based on the low performance mode timer value after selecting the second power source and selecting the second clock frequency.

37. The method of claim 35 further comprising:
- responsive to receiving the performance mode override input indicating a high performance mode:
  - selecting the first power source to provide power to the functional block at the first voltage level, and selecting the first clock frequency associated with the first voltage level to clock the functional block.

38. The method of claim 35 further comprising:
- responsive to receiving the performance mode override input indicating the low performance mode:
  - selecting the second power source to provide power to the functional block at the second voltage level lower than the first voltage level, and selecting the second clock frequency lower than the first clock frequency and associated with the second voltage level to clock the functional block.

39. A non-transitory computer-readable medium having stored thereon computer-executable instructions to cause a processor to implement a method for synthesizing an intermediate performance level for a functional block of an integrated circuit, the method comprising:
- receiving as input a performance mode input; and
- responsive to receiving the performance mode input indicating a synthesized performance mode:
  - selecting a first power source to provide power to the functional block at a first voltage level for a first predefined time interval, and selecting a first clock frequency associated with the first voltage level to clock the functional block for the first predefined time interval; and
  - selecting a second power source to provide power to the functional block at a second voltage level lower than the first voltage level for a second predefined time interval, and selecting a second clock frequency lower than the first clock frequency and associated with the second voltage level to clock the functional block for the second predefined time interval;
- receiving as input a performance mode override input triggered by a predefined condition within the integrated circuit and indicating a low performance mode; and
- responsive to receiving the performance mode override input indicating the low performance mode:
  - selecting the second power source to provide power to the functional block at the second voltage level lower than the first voltage level, and selecting the second clock frequency lower than the first clock frequency and associated with the second voltage level to clock the functional block.

40. The non-transitory computer-readable medium of claim 39 having stored thereon computer-executable instructions to cause the processor to implement the method further comprising:
- receiving as input a high performance mode timer value and a low performance mode timer value;
- initiating a countdown timer for the first predefined time interval based on the high performance mode timer value after selecting the first power source and selecting the first clock frequency; and
- initiating the countdown timer for the second predefined time interval based on the low performance mode timer value after selecting the second power source and selecting the second clock frequency.

41. The non-transitory computer-readable medium of claim 38 having stored thereon computer-executable instructions to cause the processor to implement the method further comprising:
- responsive to receiving the performance mode override input indicating a high performance mode:
  - selecting the first power source to provide power to the functional block at the first voltage level, and selecting the first clock frequency associated with the first voltage level to clock the functional block.

42. The non-transitory computer-readable medium of claim 38 having stored thereon computer-executable instructions to cause the processor to implement the method further comprising:
- responsive to receiving the performance mode override input indicating the low performance mode:
  - selecting the second power source to provide power to the functional block at the second voltage level lower than the first voltage level, and selecting the second clock frequency lower than the first clock frequency and associated with the second voltage level to clock the functional block.

* * * * *